US012680496B2

(12) United States Patent  
Patel et al.

(10) Patent No.: US 12,680,496 B2  
(45) Date of Patent: Jul. 14, 2026

(54) HIGH ENTROPY ALLOY REPAIR OF NICKEL AND COBALT SUPERALLOYS

(71) Applicants: Pratt & Whitney Canada Corp., Longueuil (CA); Concordia University, Montreal (CA); The Royal Institution for the Advancement of Learning/McGill University, Montreal (CA)

(72) Inventors: Payank Patel, Montreal (CA); Mary E. Makowiec, Manchester, CT (US); Joël Larose, Longueuil (CA); Navid Sharifi, Verdun (CA); Pantcho P. Stoyanov, Beaconsfield (CA); Christian Moreau, Boucherville (CA); Richard Chromik, Montreal (CA)

(73) Assignees: Pratt & Whitney Canada Corp., Longueuil (CA); Concordia University, Montreal (CA); The Royal Institution for the Advancement of Learning/McGill University, Montreal (CA)

( * ) Notice: Subject to any disclaimer, the term of this patent is extended or adjusted under 35 U.S.C. 154(b) by 0 days.

(21) Appl. No.: 18/738,570

(22) Filed: Jun. 10, 2024

(65) Prior Publication Data

US 2024/0410312 A1 Dec. 12, 2024

Related U.S. Application Data

(60) Provisional application No. 63/472,264, filed on Jun. 9, 2023.

(51) Int. Cl.  
C23C 4/129 (2016.01)  
C22C 30/00 (2006.01)  
(Continued)

(52) U.S. Cl.  
CPC ................ *F02C 3/14* (2013.01); *C22C 30/00* (2013.01); *C23C 4/08* (2013.01); *C23C 4/129* (2016.01);  
(Continued)

(58) Field of Classification Search  
CPC ........ F05D 2230/80; B23P 6/00; B23P 6/002; F01D 5/005; C22C 30/00;  
(Continued)

(56) References Cited

U.S. PATENT DOCUMENTS 5,866,518 A 2/1999 Dellacorte et al.  
8,753,417 B1 6/2014 Dellacorte et al.  
(Continued)

FOREIGN PATENT DOCUMENTS

CN 104561878 A 4/2015  
CN 110117788 A 8/2019  
(Continued)

OTHER PUBLICATIONS

Xiao et al. (Applicant's Specification paragraph [0012]) (Year: 2020).*

(Continued)

*Primary Examiner* — Sarang Afzali  
*Assistant Examiner* — Darrell C Ford  
(74) *Attorney, Agent, or Firm* — Bachman & LaPointe, P.C.

(57) ABSTRACT

A method for repairing damage at a damage site on the surface of a nickel- or cobalt-based alloy. The method includes: machining at the damage site; and applying a high entropy alloy (HEA) repair material to the damage site via high velocity oxy-fuel (HVOF) spray, high velocity air-fuel (HVAF) spray, or cold spray.

22 Claims, 9 Drawing Sheets

(51) Int. Cl.
|  |  |
|---|---|
| *C23C 4/08* | (2016.01) |
| *F02C 3/14* | (2006.01) |
| *F02C 7/28* | (2006.01) |

(52) U.S. Cl.
CPC ............ *F02C 7/28* (2013.01); *F05D 2230/80* (2013.01); *F05D 2300/17* (2013.01)

(58) Field of Classification Search
CPC ......... Y10T 29/49318; Y10T 29/49718; Y10T 29/49719; Y10T 29/49721; Y10T 29/49723; Y10T 29/49726; Y10T 29/49728; Y10T 29/49732; Y10T 29/49734; Y10T 29/49737; Y10T 29/49742; Y10T 29/49746
USPC .............. 29/402.01, 402.02, 402.09, 402.16, 29/402.18
See application file for complete search history.

(56) References Cited

U.S. PATENT DOCUMENTS

| | | | | |
|---|---|---|---|---|
| 11,643,939 | B2 | 5/2023 | Stoyanov et al. | |
| 2003/0033702 | A1* | 2/2003 | Berry ...................... | B23P 6/007 |
| | | | | 427/140 |
| 2003/0148141 | A1* | 8/2003 | Zhao ................... | C23C 28/3455 |
| | | | | 428/668 |
| 2005/0217110 | A1 | 10/2005 | Topal | |
| 2006/0248718 | A1* | 11/2006 | Szela ................... | B23K 1/0018 |
| | | | | 29/402.13 |
| 2011/0146848 | A1* | 6/2011 | Bewlay ................... | C22C 27/02 |
| | | | | 148/423 |
| 2011/0168679 | A1* | 7/2011 | Qi ........................... | F01D 5/005 |
| | | | | 219/121.64 |
| 2015/0118516 | A1* | 4/2015 | Boileau ..................... | C23C 4/08 |
| | | | | 428/653 |
| 2016/0069184 | A1* | 3/2016 | Ribic ................ | B23K 26/0626 |
| | | | | 219/76.12 |
| 2016/0201169 | A1* | 7/2016 | Vecchio .................. | C22C 32/00 |
| | | | | 420/580 |
| 2017/0122561 | A1* | 5/2017 | Nagaraj ..................... | F02C 7/24 |
| 2020/0149417 | A1* | 5/2020 | McCaffrey .............. | F01D 11/12 |
| 2020/0291532 | A1* | 9/2020 | Delfan-Azari .......... | F01D 5/288 |
| 2020/0318737 | A1 | 10/2020 | Stoyanov et al. | |
| 2021/0156007 | A1* | 5/2021 | Chen ........................ | C23C 4/08 |
| 2021/0270369 | A1 | 9/2021 | Harrington et al. | |
| 2022/0065122 | A1 | 3/2022 | Stoyanov et al. | |
| 2022/0325797 | A1 | 10/2022 | Stoyanov et al. | |
| 2024/0410045 | A1 | 12/2024 | Islas Encalada et al. | |
| 2024/0410046 | A1 | 12/2024 | Patel et al. | |

FOREIGN PATENT DOCUMENTS

| | | | |
|---|---|---|---|
| CN | 113930754 | A | 1/2022 |
| CN | 114032489 | A | 2/2022 |
| CN | 114231882 | A | 3/2022 |
| CN | 114369786 | A | 4/2022 |
| CN | 114411081 | A | 4/2022 |
| CN | 114669820 | A | 6/2022 |
| CN | 114669956 | A | 6/2022 |
| CN | 114703472 | A | 7/2022 |
| CN | 111763904 | B | 11/2022 |
| CN | 115401195 | A | 11/2022 |
| CN | 115418595 | A | 12/2022 |
| CN | 115449790 | A | 12/2022 |
| CN | 112553564 | B | 1/2023 |

OTHER PUBLICATIONS

Payank Patel et al., "Microstructurral and Tribological Behavior of Thermal Spray CrMnFeCoNi High Entropy Alloy Coatings", J Therm Spray Tech, Mar. 9, 2022, pp. 1285-1301, Springer, Berlin, Germany.

Lei Li et al., "High-Temperature Friction and Wear Features of Nickel-Based Ssingle Crystal Superalloy", Tribology Letters, Jan. 21, 2020, Springer, Berlin, Germany.

European Search Report dated Jul. 17, 2024 for European Patent Application 24181134.8.

Yan Cui et al., "Wear Resistance of FeCoCrNiMnAlx High-Entropy Alloy Coatings at High Temperature", Applied Surface Science, May 15, 2020, p. 145736, vol. 512, Elsevier, Amsterdam, the Netherlands.

European partial search report dated Oct. 4, 2024 for European Patent Application No. 24181087.8.

Extended European Search Report dated Jan. 3, 2025 for European Patent Application No. 24181087.8.

Yang et al., "Electroplasticity in the Al0.6CoCrFeNiMn High Entropy Alloy Subjected to Electrically-Assisted Uniaxial Tension", Journal of Materials Science & Technology, Jun. 10, 2023, pp. 209-221, vol. 148, Elsevier, Amsterdam, the Netherlands.

He et al., "Effects of Al Addition on Structural Evolution and Tensile Properties of the FeCoNiCrMn High Entropy Alloy System", Acta Materialia, Jan. 2014, pp. 105-113, vol. 62, Elsevier, Amsterdam, the Netherlands.

Luo et al., "Tribological Behavior of High Entropy Alloy Coatings: A Review", Coatings, Sep. 29, 2022, p. 1428, vol. 12, issue 10, MDPI, Basel, Switzerland.

Tian et al., "Microstructure and Wear Behavior of Atmospheric Plasma-Sprayed AlCoCrFeNiTi High-Entropy Alloy Coating", Journal of Materials Engineering and Performance, December, Oct. 18, 2016, pp. 5513-5521, vol. 25, ASM International, Materials Park, Ohio.

Xiao et al., "Microstructure and Wear Behavior of FeCoNiCrMn High Entropy Alloy Coating Deposited by Plasma Spraying", Surface & Coatings Technology, Jan. 31, 2020, p. 125430, vol. 385, Elsevier, Amsterdam, the Netherlands.

Lobel et al., "Microstructure and Wear Behavior of the High-Velocity-Oxygen-Fuel Sprayed and Spark Plasma Sintered High-Entropy Alloy AlCrFeCoNi", Advanced Engineering Materials, Dec. 23, 2020, p. 2001253, vol. 23, Wiley-VCH GmbH, Weinheim, Germany.

Patel et al., "Microstructural and Tribological Behavior of Thermal Spray CrMnFeCoNi High Entropy Alloy Coatings", Journal of Thermal Spray Technology, Apr. 2022, pp. 1285-1301, vol. 31, Springer, Berlin, Germany.

Li et al., "Subsonic-Flame-Sprayed CoCrFeNi, AlCoCrFeNi and MnCoCrFeNi-Based High-Entropy Alloy Coatings and Their Tribological Behaviors", Journal of Thermal Spray Technology, Nov. 23, 2022, pp. 96-110, vol. 32, Springer, Berlin, Germany.

Li et al., "A Low-Cost Second Generation Single Crystal Superalloy DD6", Superalloys 2000, Jan. 2000, pp. 777-783, TMS (The Minerals, Metals & Materials Society), Pittsburgh, Pennsylvania.

* cited by examiner

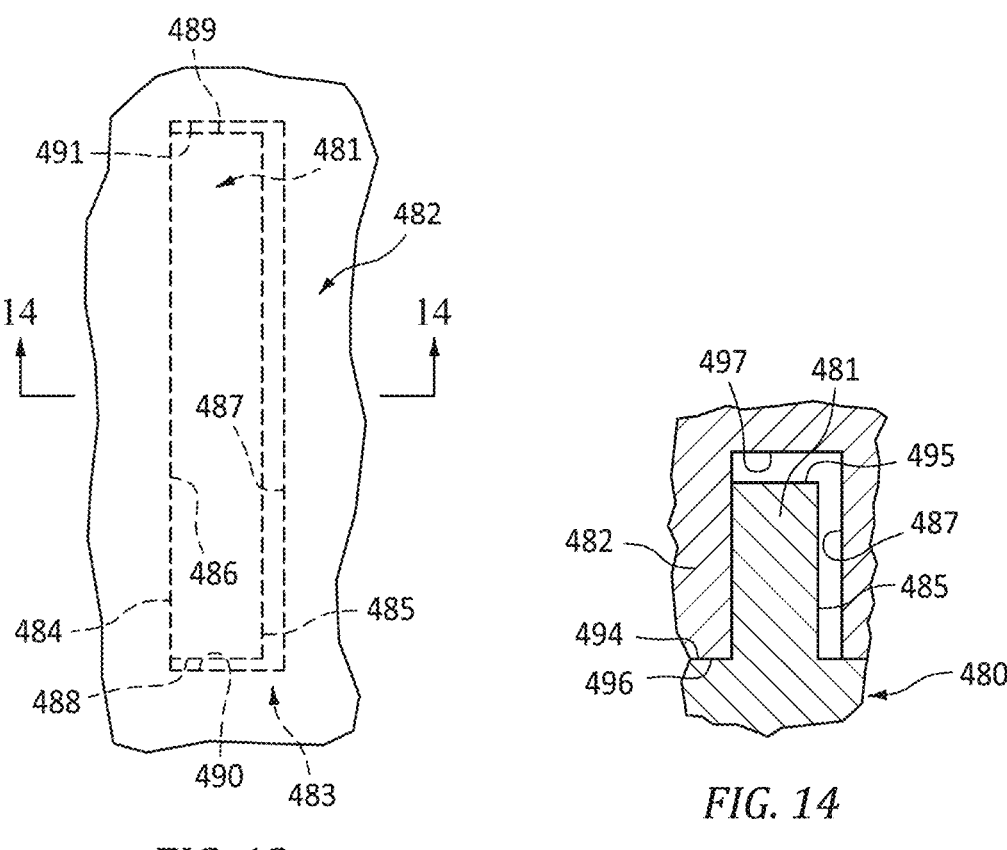
*FIG. 13*
*FIG. 14*
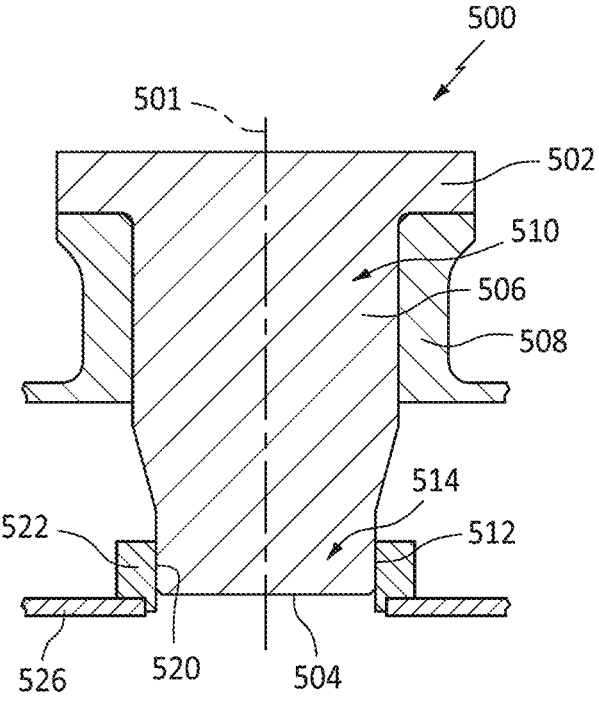
*FIG. 15*

HIGH ENTROPY ALLOY REPAIR OF NICKEL AND COBALT SUPERALLOYS

CROSS-REFERENCE TO RELATED APPLICATION

Benefit is claimed of U.S. Patent Application No. 63/472,264, filed Jun. 9, 2023, and entitled "High Entropy Alloy Repair of Nickel and Cobalt Superalloys", the disclosure of which is incorporated by reference herein in its entirety as if set forth at length.

BACKGROUND

The disclosure relates to gas turbine engines. More particularly, the disclosure relates to repair of nickel and cobalt superalloys.

Gas turbine engines (used in propulsion and power applications and broadly inclusive of turbojets, turboprops, turbofans, turboshafts, industrial gas turbines, and the like) have many components made of nickel- or cobalt-based superalloys that are subject to wear loading and potential local damage.

Example existing repair techniques for such damage include processes with two main coating steps such as a NiCr filler (e.g., applied by air plasma spray (APS)) followed by applying a tribological coating (e.g., Tribaloy® T-800 Co—Mo—Cr—Si intermetallic or Stellite® 6 Co—Cr alloy both of Kennametal Inc., Latrobe PA applied by APS).

Coatings produced by different thermal spray techniques are being used in a wide variety of applications. They can perform different functions such as thermal barriers, abradable, corrosion and wear resistant and, for each application, different strategies and choices of materials can be used to achieve the different properties desired for the target application. When high temperature conditions are involved, the protection against wear and corrosion in elevated temperatures becomes a main engineering challenge, because oxidation and the attack by corrosive elements combined with friction and mechanical wear can damage the materials exposed to those conditions, leading to premature failure of engineered parts.

Currently, superalloy (e.g., IN718) static seals are commonly used uncoated in turbine engine hot sections and may be subject to damage by hot corrosion. Effects of hot corrosion often are reflected in weight/mass gain. Bare superalloys may have a weight gain up to 25 mg/cm² when exposed to hot corrosion conditions such as 0.5 mg/cm² of $Na_2SO_4$ at 900° C. for 24 hours. Such high weight gain means that the alloy is being attacked by sulfur, which could lead to premature failure of the seal and mating counterface component. Furthermore, these parts are also exposed to severe tribological conditions, which means they suffer premature wear during high temperature operation.

Conventional Ni- and Co-based alloys (e.g., IN718, Mar-M-247, PWA1484, PW 1480 and Haynes® 188) are being widely used in the aerospace industry, however, have shown some limitations when operating in demanding service conditions. The failure of such components is commonly attributed to surface phenomena such as friction, wear, oxidation, and corrosion. The development of coatings to gas turbine engine tribological interfaces can provide protection against friction and wear, corrosion, high thermal residual stresses, local heating, or oxidation etc., which can significantly improve the performance with diminished operating costs.

The use of commercially available self-lubricating coatings can increase the lifetime of these parts by improving tribological performance. However, these self-lubricating coatings (such as the NASA-developed PS304 and PS400) have shown poor resistance to hot corrosion conditions. PS304 is disclosed in U.S. Pat. No. 5,866,518 of DellaCorte et al., entitled "Self-Lubricating Composite Chromium Oxide, issued Feb. 2, 1999. PS304 generally has NiCr binder with $Cr_2O_3$ hardener and Ag+ fluorides solid lubricant. PS400 is disclosed in U.S. Pat. No. 8,753,417 of DellaCorte et al., entitled "High Temperature Solid Lubricant Coating for High Temperature Wear Applications", issued Jun. 17, 2014. PS400 generally has NiMoAl binder with $Cr_2O_3$ hardener and Ag+ fluorides solid lubricant.

A more recent proposal for a coating for such a PSR is found in US Patent Application Publication 2021/0270369A1 (the '369 publication), of Stoyanov et al., entitled "Wear Resistant Self-Lubricating Static Seal", published Jan. 6, 2022, the disclosure of which is incorporated by reference herein in its entirety as if set forth at length. Another is found in US Patent Application Publication No. 2022/0325797A1 (the '797 publication), of Stoyanov et al., entitled "Low Friction, Wear Resistant Piston Seal", published Oct. 13, 2022. The '797 publication discloses a coating with a CoCr alloy binder phase and a hard particle phase comprising $Cr_2O_3$. Application is via HVOF.

Another seal configuration is the W-seal of which an example is found in US Patent Application Publication 2022/0065122A1 (the '122 publication) of Stoyanov et al., entitled "Seals and Methods of Making Seals", published Mar. 3, 2022, the disclosure of which is incorporated by reference herein in its entirety as if set forth at length. The '122 publication discloses both PSR and self-sprung compression seals. The self-sprung compression seals have cross-sections characterized by one or more cycles of a C-shape or W-shape. With such seals, sometimes because of seal orientation a different letter may be used (e.g., the letter E may be used to designate a radially compressed seal; whereas, the letter W may be used to designate an axially-compressed seal of similar cross-section but oriented 90° opposite). The '122 publication discloses both baseline seals made of conventional alloys (e.g., nickel-based superalloys) and modified seals made of HEA.

High entropy alloy (HEA) materials have been proposed for substrate use and as coatings wear coatings for tribological interfaces. Typical HEA have the same atomic percentages of each of their components and such alloys are also known as equiatomic multicomponent alloys. Departures from nominal equiatomic content are often identified with a decimal subscript for the element departing from equiatomic so that $Al_xCoCrFeNi$ would have nominally equiatomic Co, Cr, Fe, and Ni content and x times that content of Al.

Xiao et al. identifies FeCoNiCrMn coatings. Xiao et al., "Microstructure and wear behavior of FeCoNiCrMn high entropy alloy coating deposited by plasma spraying", *Surface and Coatings Technology*, February, 385 (February), Elsevier BV, Amsterdam, Netherlands. Patel et al disclose HVOF CrMnFeCoNi coatings. Payank Patel et al., Microstructural and Tribological Behavior of Thermal Spray CrMnFeCoNi High Entropy Alloy Coatings", *Journal of Thermal Spray Technology*, April 2022, Volume 31, Issue 4, p. 1285-1301 Springer Nature Switzerland AG, Cham, Switzerland (hereafter Patel et al., the disclosure of which is incorporated by reference herein in its entirety as if set forth at length).

Löbel et al. identifies HVOF AlCrFeCoNi HEA coatings of essentially equal atomic percentages. Löbel et al., "Microstructure and Wear Behavior of the High-Velocity-Oxygen-Fuel Sprayed and Spark Plasma Sintered High-Entropy Alloy AlCrFeCoNi", *Advanced Engineering Materials*, Dec. 23, 2020, Vol. 23 (4), Wiley-VCH GmbH, Weinheim, Germany.

SUMMARY

One aspect of the disclosure involves a method for repairing damage at a damage site on the surface of a nickel- or cobalt-based alloy component The method comprises: machining at the damage site; and applying a high entropy alloy (HEA) repair material to the damage site via high velocity oxy-fuel (HVOF) spray, high velocity air-fuel (HVAF) spray, or cold spray.

In a further embodiment of any of the foregoing embodiments, additionally and/or alternatively, the applying is via HVOF.

In a further embodiment of any of the foregoing embodiments, additionally and/or alternatively, the surface is full annulus or a sector of an annulus; and the applying is only to a partial circumferential extent of said full annulus or sector.

In a further embodiment of any of the foregoing embodiments, additionally and/or alternatively, the surface is an inner diameter surface.

In a further embodiment of any of the foregoing embodiments, additionally and/or alternatively, the surface is an axial end surface of a groove.

In a further embodiment of any of the foregoing embodiments, additionally and/or alternatively, the surface is an axial end surface of a radial tab, optionally one to be installed in a slot in a mating component.

In a further embodiment of any of the foregoing embodiments, additionally and/or alternatively, the surface is an inner diameter surface or an outer diameter surface of a snap interface, optionally of a combustor component.

In a further embodiment of any of the foregoing embodiments, additionally and/or alternatively, the surface is an inner diameter surface of a mounting pin socket.

In a further embodiment of any of the foregoing embodiments, additionally and/or alternatively, the repair material comprises in atomic percent: 12.0 to 35.0 each of four elements with no more than a 10.0 percentage points difference between the lowest content of said four and the highest content of said four.

In a further embodiment of any of the foregoing embodiments, additionally and/or alternatively, cobalt is one of the four elements.

In a further embodiment of any of the foregoing embodiments, additionally and/or alternatively, the repair material comprises in atomic percent: 16.0 to 25.0 Fe; 16.0 to 25.0 Co; 16.0 to 25.0 Cr 16.0 to 25.0 Mn; and 16.0 to 25.0 Ni.

In a further embodiment of any of the foregoing embodiments, additionally and/or alternatively, the repair material comprises by atomic percent: no more than 1.0 other individually and 5.0 other total.

In a further embodiment of any of the foregoing embodiments, additionally and/or alternatively, one or more of: the repair material is applied to a thickness of at least 0.50 millimeter; a powder feed rate of the HVOF spray is 40 g/min. to 50 g/min.; and a rate of oxygen is 100% to 250% a rate of fuel in the HVOF spray, measured in LPM.

In a further embodiment of any of the foregoing embodiments, additionally and/or alternatively, the method further comprises surface finishing to remove excess repair material.

In a further embodiment of any of the foregoing embodiments, additionally and/or alternatively, the method further comprises: disengaging the surface of the component from a second component prior to the machining; and, after the applying, reengaging the surface of the component to the second component or to a replacement second component.

In a further embodiment of any of the foregoing embodiments, additionally and/or alternatively, the reengaging or engaging is without any further thermal sprayed coating atop the HEA repair material.

In a further embodiment of any of the foregoing embodiments, additionally and/or alternatively, a gas turbine engine includes a component repaired according to the method and further comprises: one or more compressor sections; a combustor; one or more turbine sections; and a gaspath passing through the one or more compressor sections, the combustor section, and the one or more turbine sections, said component being a first component contacting a second component at said surface. Optionally, the second component is a seal and said first component is a counterface component for the seal. Optionally, said first component is a locating pin and the second component engages a distal end section of the locating pin.

A further aspect of the disclosure involves a gas turbine engine comprising: one or more compressor sections; a combustor; one or more turbine sections; and a gaspath passing through the one or more compressor sections, the combustor section, and the one or more turbine sections. A first component is sealed to a second component by a seal. The first component has a nickel or cobalt alloy substrate. The substrate has a recess containing a high entropy alloy (HEA) filler. A contact area between the seal and the first component includes the HEA filler and an adjacent surface of the substrate.

In a further embodiment of any of the foregoing embodiments, additionally and/or alternatively, the contact area is at least 355° and 1° to 5° of that is with the HEA filler.

In a further embodiment of any of the foregoing embodiments, additionally and/or alternatively, the HEA filler has a thickness of 0.30 mm to 2.0 mm.

In a further embodiment of any of the foregoing embodiments, additionally and/or alternatively, the HEA filler comprises in atomic percent: 12.0 to 35.0 each of four elements with no more than a 10.0 percentage points difference between the lowest content of said four and the highest content of said four.

In a further embodiment of any of the foregoing embodiments, additionally and/or alternatively: cobalt is one of the four elements.

In a further embodiment of any of the foregoing embodiments, additionally and/or alternatively: the second component has a radially outwardly open groove axially capturing the seal; and the first component encircles the seal.

In a further embodiment of any of the foregoing embodiments, additionally and/or alternatively: the first component has a radially outwardly open groove axially capturing the seal; and the second component encircles the seal.

In a further embodiment of any of the foregoing embodiments, additionally and/or alternatively: the first component comprises a counterface of the seal; and the seal is selected from the group consisting of piston seal rings, brush seals, and finger seals.

A further aspect of the disclosure involves a component having a contact surface for contacting another component. The component has a nickel or cobalt alloy substrate. The substrate has a recess at the contact surface containing a high entropy alloy (HEA) filler. In a further embodiment an example component is in a gas turbine engine comprising: one or more compressor sections; a combustor; one or more turbine sections; and a gaspath passing through the one or more compressor sections, the combustor section, and the one or more turbine sections. In a further embodiment the another component is a seal or a locating pin. In a further embodiment the contact area between the component and the another component includes the HEA filler and an adjacent surface of the substrate.

The details of one or more embodiments are set forth in the accompanying drawings and the description below. Other features, objects, and advantages will be apparent from the description and drawings, and from the claims.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 13 is an inward radial views of a mounting tab-in-slot joint.

FIG. 14 is a longitudinal sectional view of the joint.

FIG. 15 is a longitudinal sectional view of a locating pin joint.

Like reference numbers and designations in the various drawings indicate like elements.

DETAILED DESCRIPTION

Figure 1:
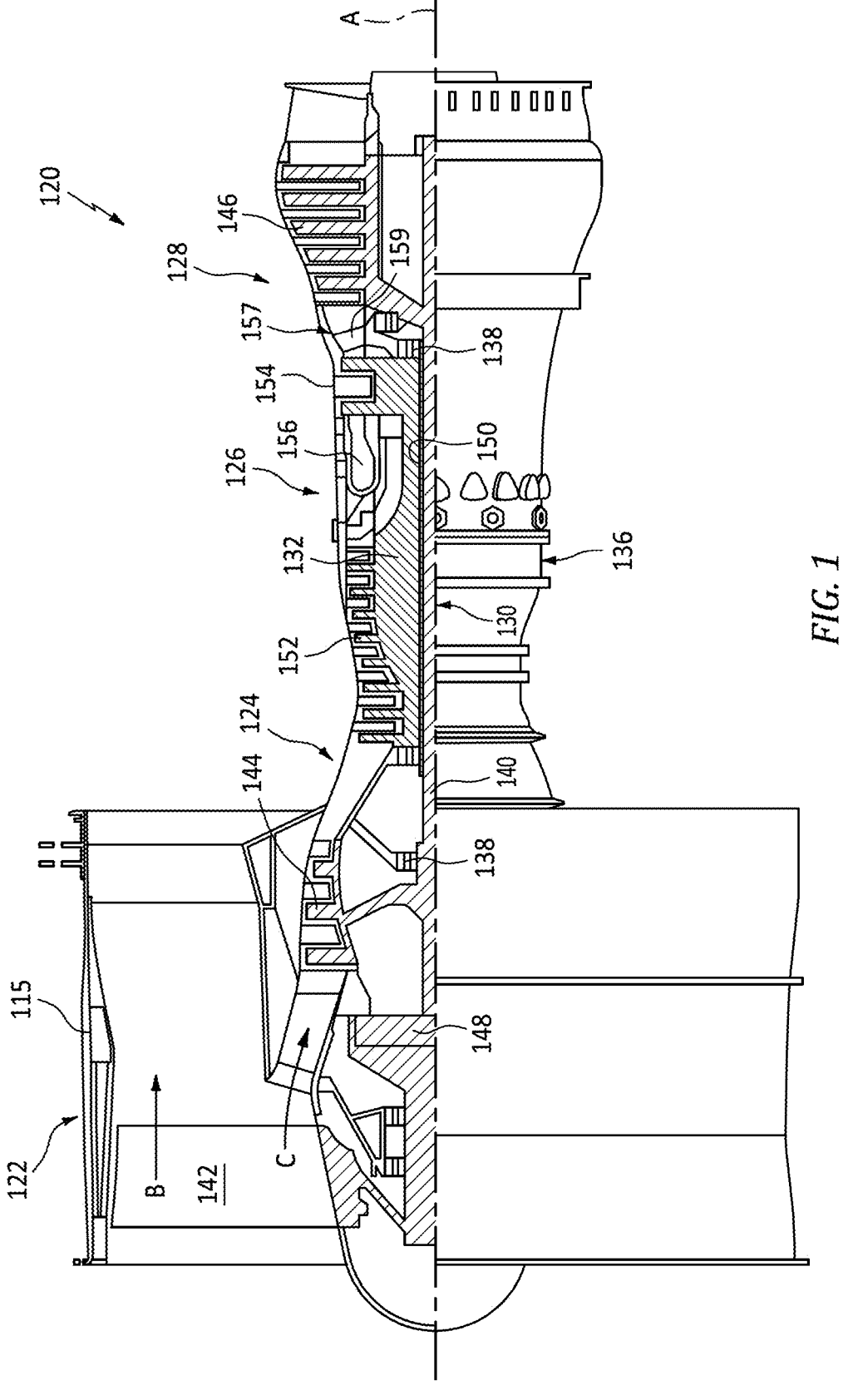
FIG. 1 view of a gas turbine engine.

FIG. 1 schematically illustrates a gas turbine engine 120. The example gas turbine engine 120 is a two-spool turbofan that generally includes a fan section 122, a compressor section 124, a combustor section 126, and a turbine section 128. The fan section 122 drives air along a bypass flow path B in a bypass duct defined within a housing 115, such as a fan case or nacelle. The fan section also initially drives air along a core flow path C for compression through the compressor section and communication into the combustor section 126 then expansion through the turbine section 128. Although depicted as a two-spool turbofan gas turbine engine in the disclosed non-limiting embodiment, it should be understood that the concepts described herein are not limited to use with two-spool turbofans as the teachings may be applied to other types of turbine engines.

The example engine 120 generally includes a low speed spool 130 and a high speed spool 132 mounted for rotation about an engine central longitudinal axis A relative to an engine static structure 136 via several bearing systems 138. It should be understood that various bearing systems 138 at various locations may alternatively or additionally be provided, and the location of bearing systems 138 may be varied as appropriate to the application.

The low speed spool 130 generally includes an inner shaft 140 that interconnects, a first (or low) pressure compressor 144 and a first (or low) pressure turbine 146. The inner shaft 140 is connected to the fan 142 through a speed change mechanism, which in the example gas turbine engine 120 is illustrated as a geared architecture 148, to drive a fan 142 at a lower speed than the low speed spool 130. The high speed spool 132 includes an outer shaft 150 that interconnects a second (or high) pressure compressor 152 and a second (or high) pressure turbine 154. A combustor 156 is between the high pressure compressor 152 and the high pressure turbine 154. A mid-turbine frame 157 of the engine static structure 136 may be arranged generally between the high pressure turbine 154 and the low pressure turbine 146. The mid-turbine frame 157 further supports one or more of the bearing systems 138 in the turbine section 128. The inner shaft 140 and the outer shaft 150 are concentric and rotate via bearing systems 138 about the engine central longitudinal axis A which is collinear with their longitudinal axes.

The core airflow is compressed by the low pressure compressor 144 then the high pressure compressor 152, mixed and burned with fuel in the combustor 156, then expanded over the high pressure turbine 154 and low 146 pressure turbine. The example mid-turbine frame 157 includes airfoils 159 which are in the core airflow path C. The turbines 146, 154 rotationally drive the respective low speed spool 130 and high speed spool 132 in response to the expansion. It will be appreciated that each of the positions of the fan section 122, compressor section 124, combustor section 126, turbine section 128, and fan drive gear system 148 may be varied. For example, gear system 48 may be located aft of the low pressure compressor, or aft of the combustor section 26 or even aft of turbine section 128, and fan 142 may be positioned forward or aft of the location of gear system 48

Figure 1A:
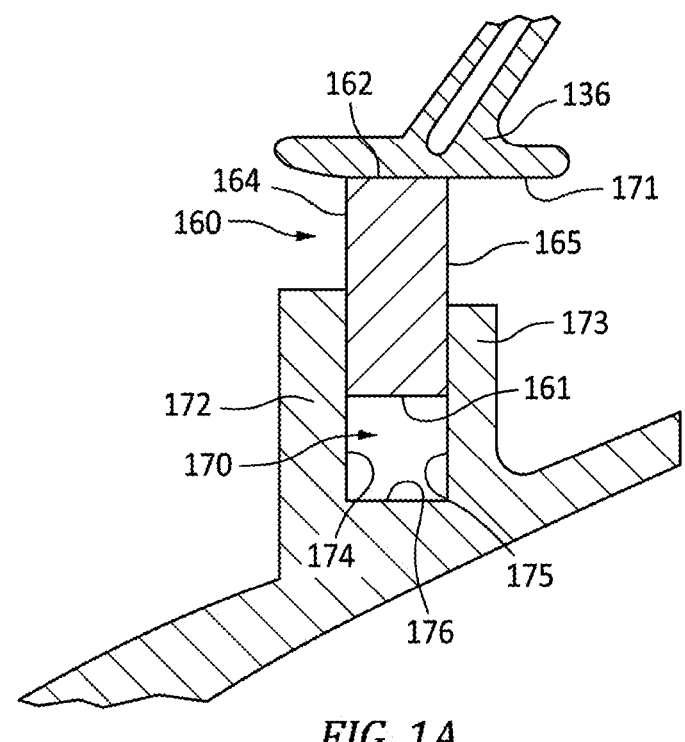
FIG. 1A is an enlarged view of a first seal system in the engine of FIG. 1.

FIG. 1A shows one example seal in the engine as a piston seal 160. The example seal 160 (and its metallic substrate) has an inner diameter (ID) surface 161, an outer diameter (OD) surface 162, and axial end surfaces 164 and 165. The seal follows a constant cross-sectional shape and forms a split ring with a shiplap or similar joint (not shown).

In the illustrated example, the piston seal 160 is partially accommodated in a radially outwardly open groove 170 in an inner member and its OD surface is engaged to an inner diameter (ID) surface 171 of an outer member. The example inner member is a vane structure (e.g., circumferential vane array) of the mid turbine frame 157. The example outer member is a seal runner of the static structure 136. The example groove is formed by the interior surfaces 174, 175 of wall sections 172, 173 and a base surface 176. The example walls have OD rims and outboard axial faces opposite the respective faces 174, 175.

Principal contact between the seal and the contacting members is between the seal OD surface 162 and the runner ID surface 171. Additional contact may be between the seal axial end surfaces and the adjacent groove wall surface. Wear and damage may occur at any of these. Typically, the counterface members nay be uncoated alloy at the interfaces (e.g., uncoated at the surfaces 171, 174, 175).

Another example for repair is a component interfacing with a spring compression static seal. For example, as in the '122 publication baseline, stainless steel or nickel- or cobalt-based superalloy or other seal substrates may be formed by deforming sheetmetal or may be cast or otherwise formed. Example seals include axial compression seals such as a bellows seal or a W-seal, or for radial compression seals, such as C-seals or E-seals. For example, seal 220 (FIG. 1B) is a bellows or similar type seal with convoluted cross-section effective to be deformed under compression to self-spring-bias engagement with the counterface members. The cross-section generally has a generally inner diameter (ID) surface 221, a generally outer diameter (OD) surface 222 generally parallel and spaced apart from the ID surface by a material thickness $T_S$, and end surfaces 224 and 225. In an installed axially compressed state, axial ends 226, 227 of the seal are formed by portions of one of the surfaces 221, 222 (both 221 in the example). The illustrated seal is a W-seal although other configurations are possible (e.g., more or fewer cycles of the cross-sectional wave form) as are radial seals (e.g., an E-seal).

For the example seal 220, forward counterface members engaging the axial end 226 are a radially extending end surface portions 230 of a circumferential array of blade outer air seals (BOAS) 232. BOAS ID surfaces closely surround tips of airfoils 240 of a stage of blades 242. For the example seal 220, aft counterface members engaging the axial end are a radially extending end surface portions 250 of the OD shrouds 254 of a circumferential array of vanes 252. Example vanes are in clusters with multiple airfoils 253 per cluster. Alternatives include singlets.

In these example embodiments, wear or damage may notably occur to counterface surfaces 171, 174, 175, 230, and 250. Each example counterface member (including others discussed below to be repaired) may be formed of a nickel- or cobalt-based based (e.g., largest by weight component Ni or Cr, respectively) alloy or superalloy (e.g., uncoated), such as Inconel® 718 (IN-718; UNS N07718; AMS 5662), Inconel® 100 (IN-100; UNS N13100; AMS 5397)), and Inconel® 713C (IN-713C; Alloy 713C) each of (Huntington Alloys Corp., Huntington, West Virginia), Mar-M-247 and Haynes® 188 (UNS R30188) of Haynes International, Kokomo, Indiana.

Either of the wear areas, the component contacting the seal 160, 220 may receive local damage. FIG. 2 generically shows a damage site 300 in a surface 302 of a substrate 304. The surface 302 (generically representing any of counterface surfaces 171, 174, 175, 230, and 250 above and others discussed below) is in contact with the contacting seal surface. Example damage depth is shown as $H_1$.

FIG. 3 shows the damage site 300' after disengaging from the seal and locally machining (e.g., abrasive grinding) to a depth $H_2$. FIG. 4 shows a buildup of HEA repair material 310 applied by HVOF to a peak thickness $T_1$ which is greater than $H_2$. In the FIG. 4 the buildup leaves the surface 312 of the as-applied repair material proud of the adjacent portion of the surface 302. Thus, a finishing (e.g., ASTM E-3) (e.g., abrasive belting, grinding, polishing, and/or peening) may reduce the repair material to leave a finished surface 312' (FIG. 5—shown reassembled with a replacement seal 160, 220) essentially flush to the adjacent portion of the surface 302. Example machining depth $H_2$ and final coating/repair thickness $T_2$ are at least 0.30 mm or at least 0.50 mm or at least 1.0 mm (e.g., with optional upper limits in any combination with said lower limits of 3.00 mm, or 2.50 mm or 2.00 mm or 1.50 mm). An example angular span of the repair material of any single repair is small (e.g., 1° to 5°.

In one example of repair of the surface 174 or 175, an axially-open and radially outwardly open recess (not shown) is machined (e.g., abrasively ground) in the opposite wall section 173 or 172, respectively. The recess may allow access to machine the damaged surface 174 or 175 (and then machine the sprayed repair) and allows spray gun access for normal/orthogonal spray. After the repair is machined, the recess may be filled. Example filling is via the same HVOF gun and material used in the repair. The filled recess may itself be machined back to nominal contour. As a practical matter, the seal 160 may have wearing contact only with one of the two surfaces 174, 175 thus, imperfection of the other created by machining and then repairing the other is not significant and the structural weakening from filling the recess is not significant.

Figure 1B:
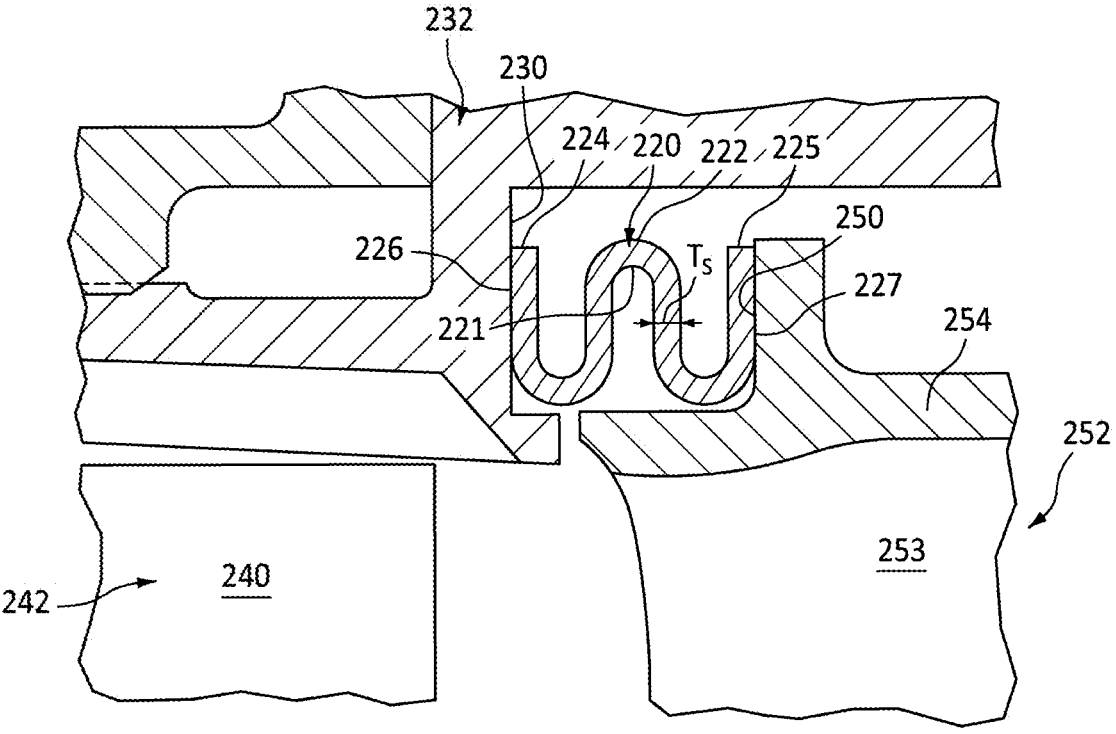
FIG. 1B is an enlarged view of a second seal system in the engine of FIG. 1.
Figures 1C, 1D, 2, 3, 4, 5:
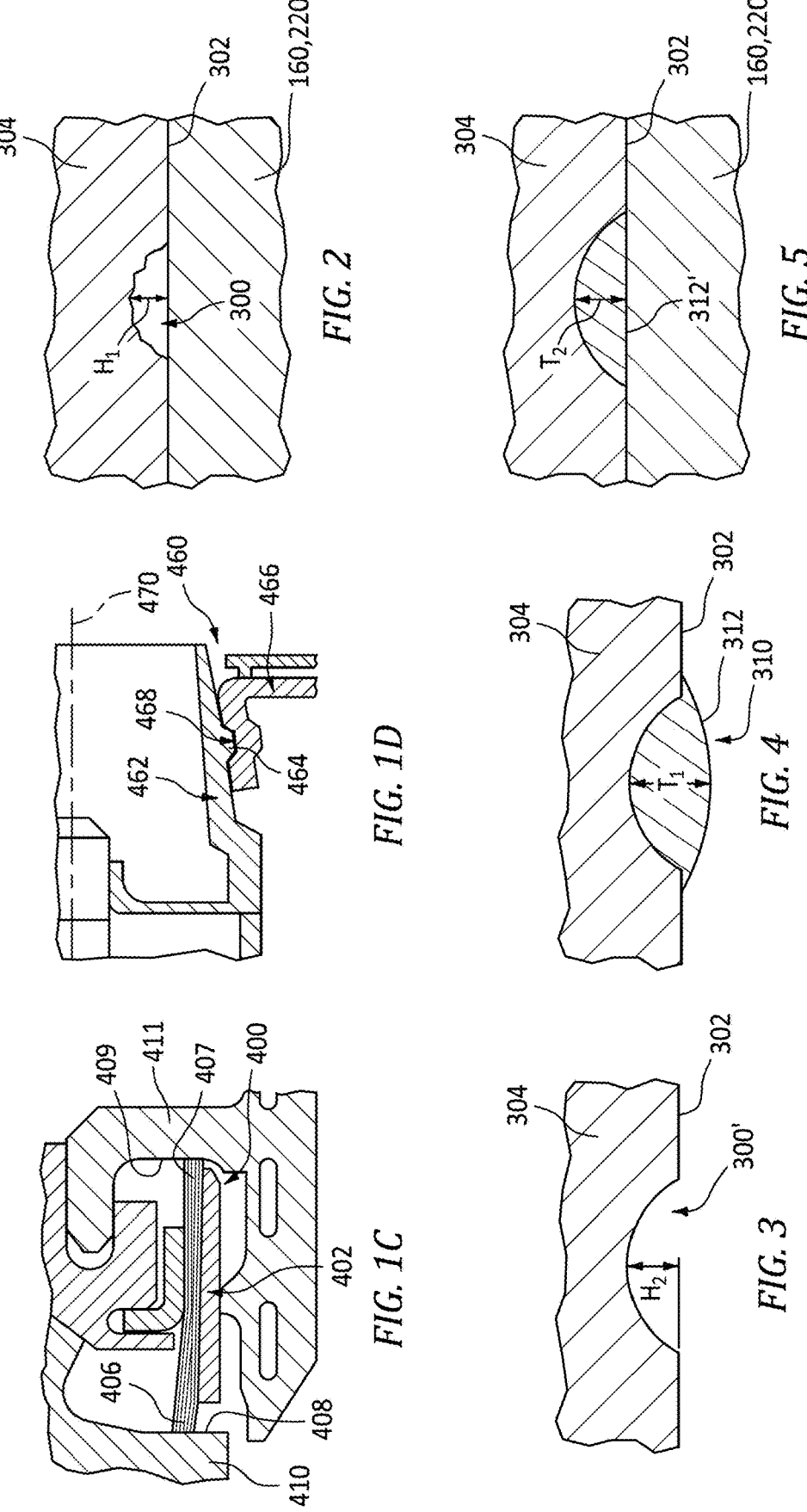
FIG. 1C is an enlarged view of a third seal system in the engine of FIG. 1.
FIG. 1D is an enlarged view combustor swirler in the engine of FIG. 1.
FIG. 2 is a transverse sectional view of a damaged substrate.
FIG. 3 is a transverse sectional view of the damaged substrate after machining of the damage.
FIG. 4 is a transverse sectional view of the damaged substrate after HVOF of repair material.
FIG. 5 is a transverse sectional view of the damaged substrate after finishing of the repair material and re-engagement with a mating component.

Because the self-sprung seal 220 is held between two different members, disassembly of the two members from each other may allow easy access to the damage site for the repair (as distinguished from the groove of FIG. 1B wherein both opposite surfaces are in a single piece).

Although these examples involve a seal as the contacting element to a repaired member, others may lack seals such as where two members other than deals directly engage.

Table 1 below shows HVOF deposition parameters for nominal FeCoCrMnNi HEA coating (using a Diamond Jet™ 2700 gun of Oerlikon Metco, Pfaeffikon, Switzerland):

TABLE 1

| | |
|---|---|
| Feed rate | 50 g/min |
| Oxygen | 151.75 LPM |
| Propylene | 86.48 LPM |
| Air | 331.90 LPM |
| Spraying distance | 150 mm |
| Transverse speed' | 1.0 m/s |
| Deposition efficiency achieved | ~76% |
| Thickness | 1.3 mm (after 30 passes) |
| Substrate temperature | 250-300° C. (with IR camera) |

Relative to the Parameters in Patel et al., this is fuel rich. We have determined that the use of fuel rich deposition parameters is beneficial in producing thicker coatings (e.g., 1.3 mm in the example) with reduced formation of oxides and porosity after 30 passes. In contrast, the use of oxygen rich deposition parameters in the Patel et al. publication, resulted in the formation of a significant amount of oxides during spraying and a final coating thickness of only 300 micrometers. To mitigate oxide formation and achieve a lower amount of oxides in the coating, relative to the parameters in the Patel et al. article, we recommend making the oxygen/fuel ratio more fuel rich and increasing the powder feed rate For example, feed rate is increased from the Patel et al. 23 g/min. to a value of at least 40 g/min. (e.g., to 50 g/min.).

Similarly, the Patel et al. oxygen to fuel ratio is almost 4:1 but is reduced to a bit less than 2:1 (more broadly the amount of oxygen (not from the air) is up to 300% of the amount of fuel, more narrowly up to 250% or 200%, with optional lower limits of 100% and 150% for any of those upper limits). Although advantageous feed rate may be relatively gun-specific, the oxygen-fuel balance is relatively insensitive to the particular gun.

Table 2 below shows feedstock blends of elemental powders for the HEA:

TABLE 2

| | | | HEA Powder | | | |
|---|---|---|---|---|---|---|
| | | | Element (Atomic Percent) | | | |
| | Fe | Co | Cr | Mn | Ni | Other |
| Ex. 1 nominal | 20 | 20 | 20 | 20 | 20 | † † |
| Ex. 2 | 20.36 | 19.46 | 20.85 | 20.27 | 19.06 | †† |
| Range 1 | 16.0 to 25.0 | 16.0 to 25.0 | 16.0 to 25.0 | 16.0 to 25.0 | 16.0 to 25.0 | †† |
| Range 2 | 17.0 to 23.0 | 17.0 to 23.0 | 17.0 to 23.0 | 17.0 to 23.0 | 17.0 to 23.0 | †† |
| Range 3 | 18.0 to 22.0 | 18.0 to 22.0 | 18.0 to 22.0 | 18.0 to 22.0 | 18.0 to 22.0 | †† |
| Range 3 | 18.5 to 21.5 | 18.5 to 21.5 | 18.5 to 21.5 | 18.5 to 21.5 | 18.5 to 21.5 | †† |

† Impurities only
†† ≤5.0 other elements total; ≤1.0 other elements individually Example 1 corresponds to nominal FeCoCrNiMn. Example 2 corresponds to the vendor-sourced powder composition and was estimated as the average value of the three readings (one EDS area analysis and two-point analyses) and is shown truncated to two decimal places although measurement precision is much coarser. Although, below the table, dagger symbols are used to provide two examples of non-listed components other values are possible. Thus, any of the examples or ranges could be multiplied by substituting the listed option for the other of the two listed options. Yet alternatively, for each of these, further alternative ranges may be provided such as ≤3.0 other elements total and ≤1.0 other elements individually; ≤2.0 other elements total and ≤1.0 other elements individually; ≤3.0 other elements total and ≤0.50 other elements individually. Additionally, the examples such as given above assume very little attrition of individual elements during the spray process. Thus, the as-sprayed coating may be characterized by any of those same examples and ranges. However, there may be attrition situations in which a source material outside one or more of the ranges is used to deposit as-deposited material within said one or more ranges (and vice-versa). The Ex. 2 feedstock powder was obtained from Eutectic Canada Inc. (of Vaudreuil-Dorion, QC, Canada) and is believed to be a single alloy powder with FCC single solid solution.

Although a single HEA was tested for the target thicknesses, other HEA may be useful. More broadly example HEA has 12.0 to 35.0 atomic percent each of at least four main metallic elements (e.g., typically four to seven or four to six main elements with no more than a 10.0 percentage points difference between the lowest content of said four and the highest content of said four (or highest and lowest contents of all main elements).

A particularly significant main element is Co in that it generates a lubricious cobalt oxide layer upon initial sliding. The remaining main HEA elements Fe, Cr, Ni, Mn, provide the basic HEA strength. The manganese stabilizes the FCC to make it more ductile to compensate for the hardness. It also forms Mn-containing oxide layer for lubricity but less significant than the Co for lubricity.

Figure 6:
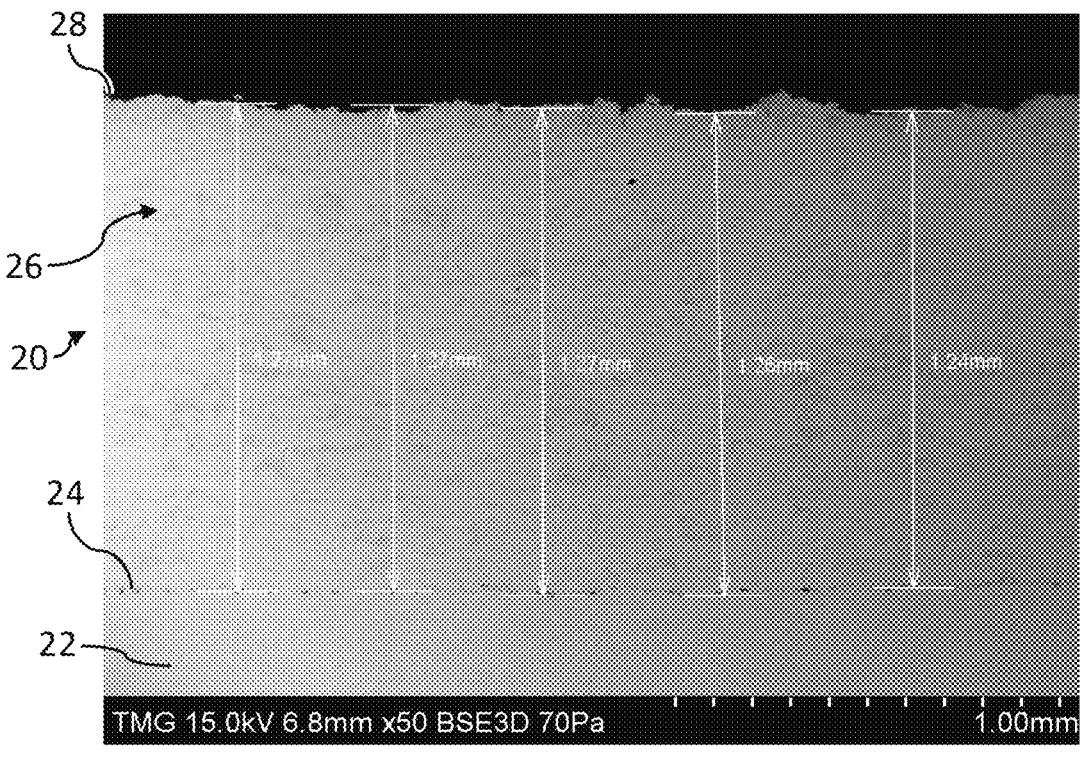
FIG. 6 is a micrograph of an HVOF FeCoCrNiMn coated substrate.

FIG. 6 shows an article 20 having an FeCoCrMnNi HEA coating 26 HVOF sprayed on a surface 24 of a substrate 22. The example FIG. 1 substrate is 304L stainless steel. The coating 26 was deposited by HVOF and the deposition parameters of Table 1. As discussed below, the substrate may be a component interfacing with a seal and the coating surface 28 surface may locally be the tribological interface with the seal.

Figure 6A:
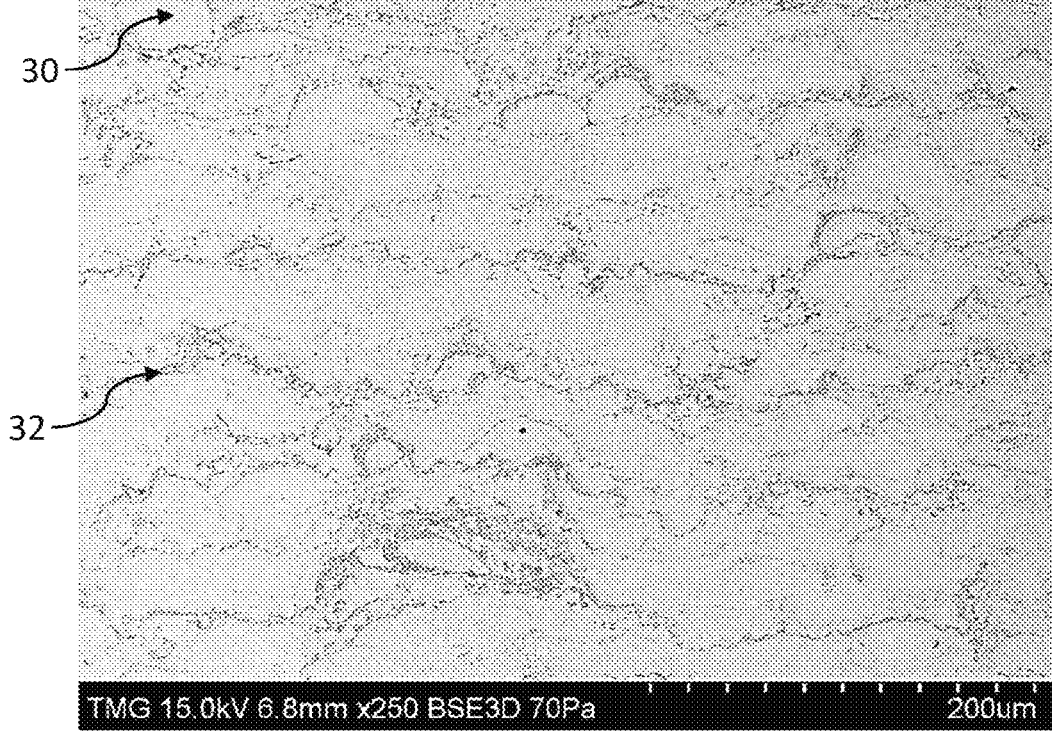
FIG. 6A is an enlarged view of the micrograph of FIG. 1.

FIG. 6A shows that the resulting material has a lamellar structure (splats) with the formation of oxides on the splat boundaries. The splats 30 (bright phase) were formed mainly by molten particles sprayed with high velocity/energy bombarding on the substrates, as shown in FIG. 6A. The dark regime 32 was mostly associated with oxides formed due to the reaction with oxygen at high temperature during spraying.

Wear and friction testing of the FeCoCrNiMn was performed against an alumina ball counterface at 5N normal load, room temperature (25° C.), sliding velocity 31 mm/s, 1 Hz, 10 mm track length, 5000 cycles, total track length 100 m. Substrate material was 304L stainless steel.

Wear and friction testing of an uncoated single-crystal uncoated DD6 substrate were performed against an $Si_3N_4$ ball counterface at 20N normal load, room temperature (25° C.), sliding velocity 560 rpm, 120 minutes, total sliding distance 75 m.

Figure 7:
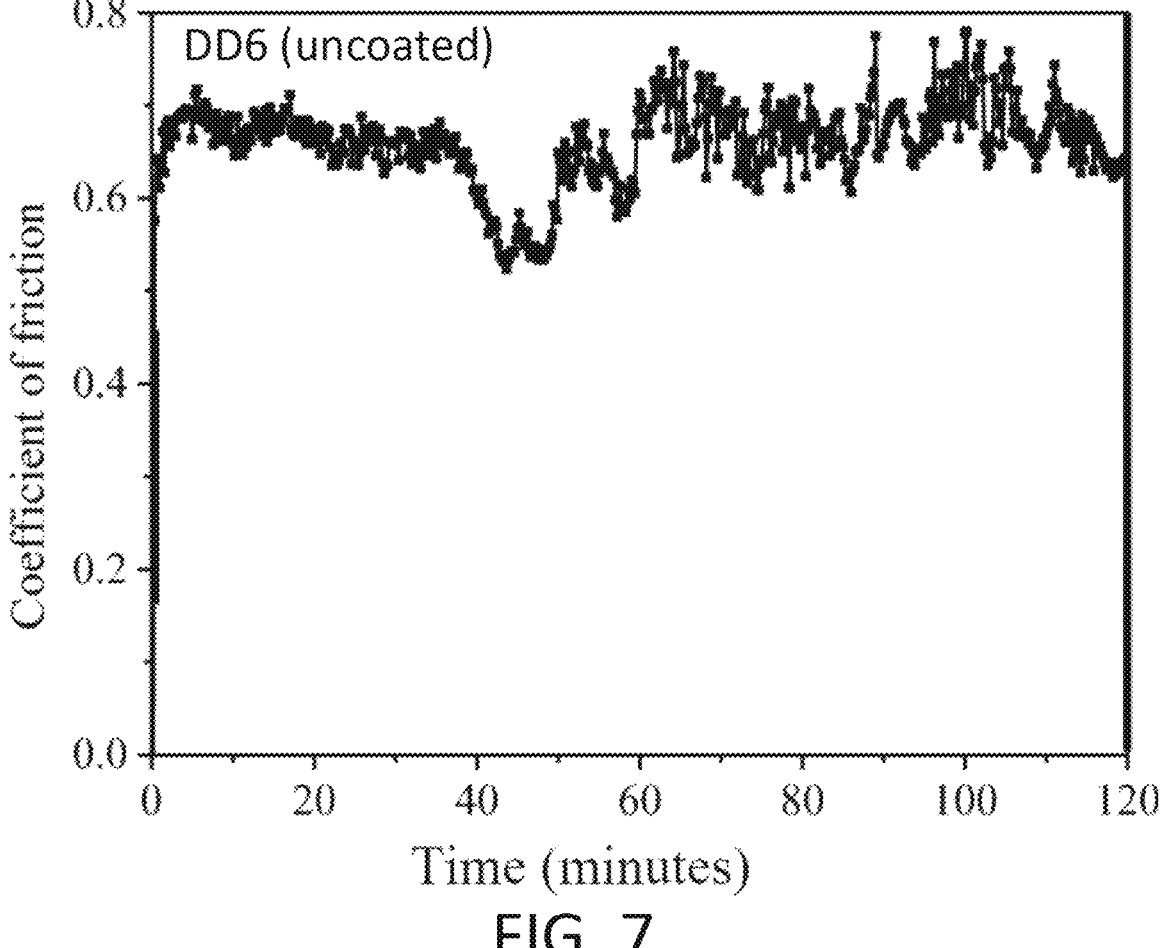
FIG. 7 is a cycle use test plot of friction coefficient for an uncoated single-crystal DD6 substrate.
Figures 8, 9:
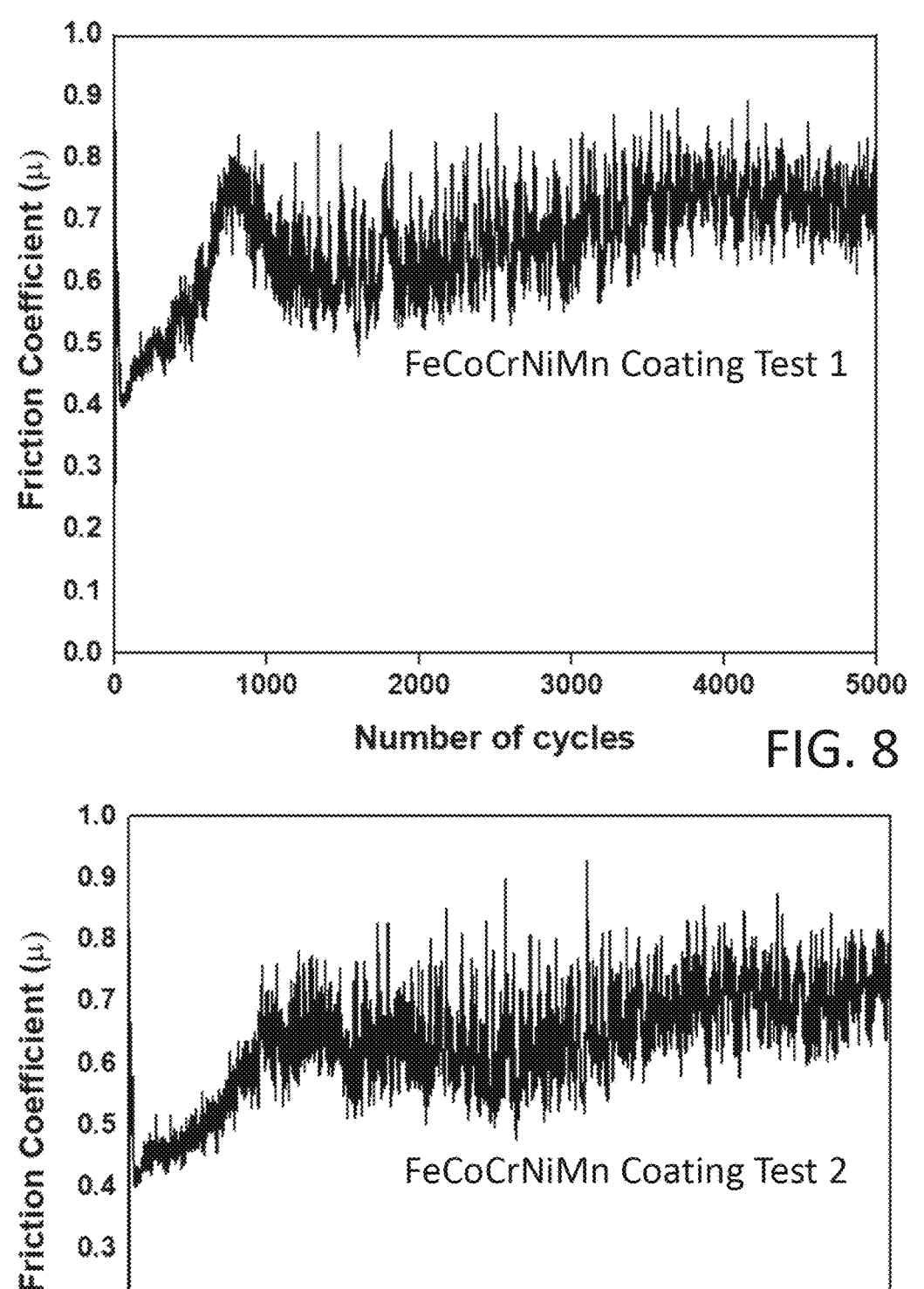
FIGS. 8 and 9 are cycle use test plots of friction coefficients for two tests on an HVOF FeCoCrMnNi HEA coating.

FIG. 7 is a cycle use test plot of friction coefficient for an uncoated single-crystal DD6 substrate. FIGS. 8 and 9 are cycle use test plots of friction coefficients for two tests on an HVOF FeCoCrMnNi HEA coating. The presence of cobalt in the HEA is believed relevant in that the cobalt may oxidize to form a lubricious coating. Relative to the DD6, the HEA exhibits lower wear.

Figure 10:
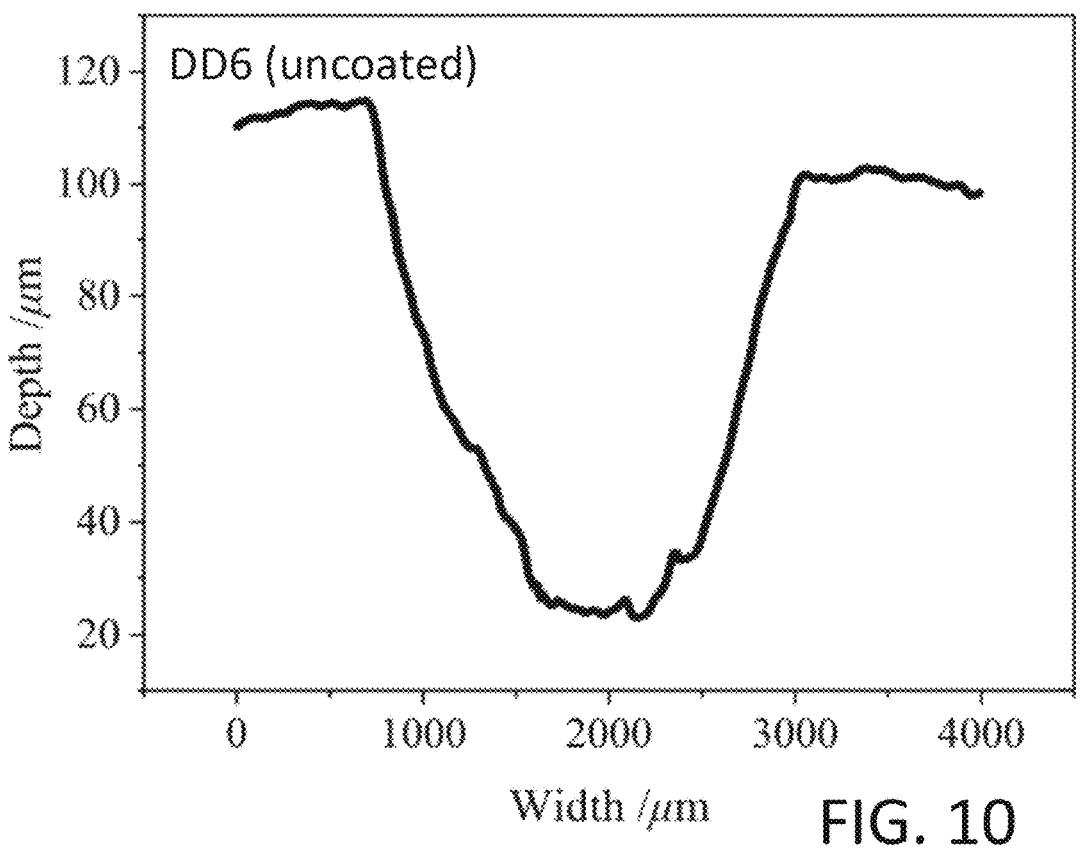
FIG. 10 is a wear track plot for an uncoated single-crystal uncoated DD6 substrate.
Figure 11:
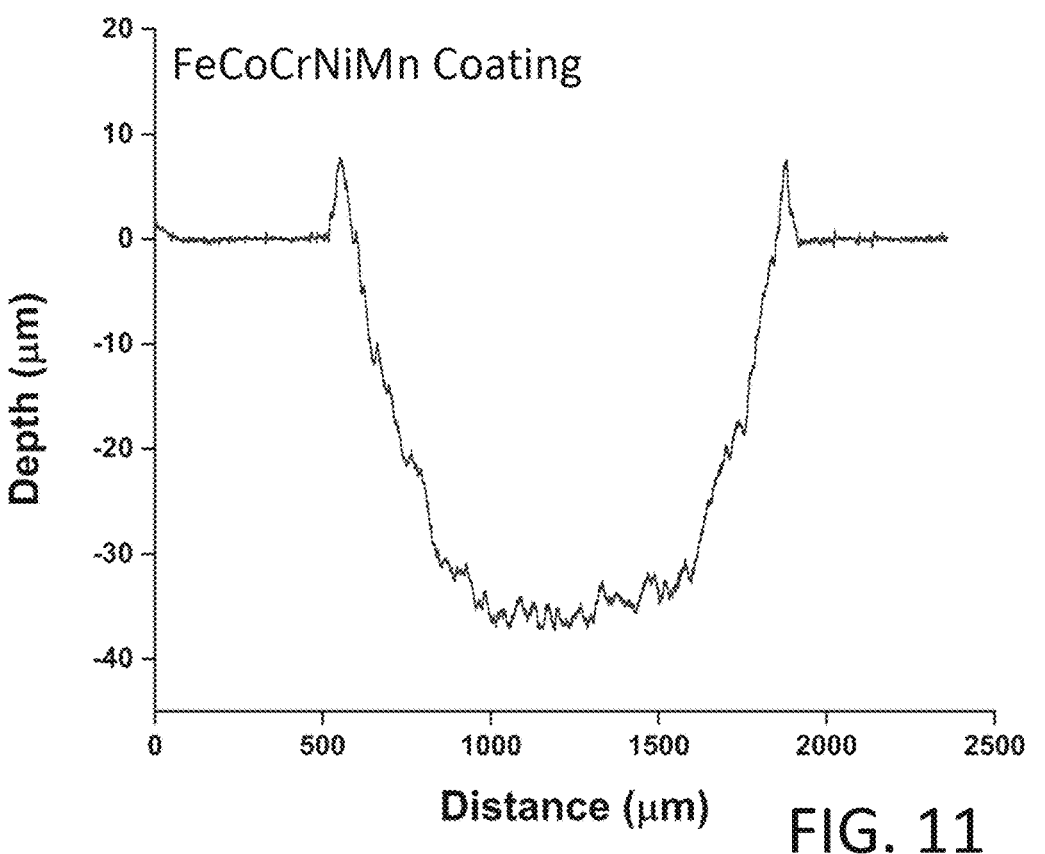
FIG. 11 is a wear track plot for an HVOF FeCoCrNiMn coated substrate.
Figure 12:
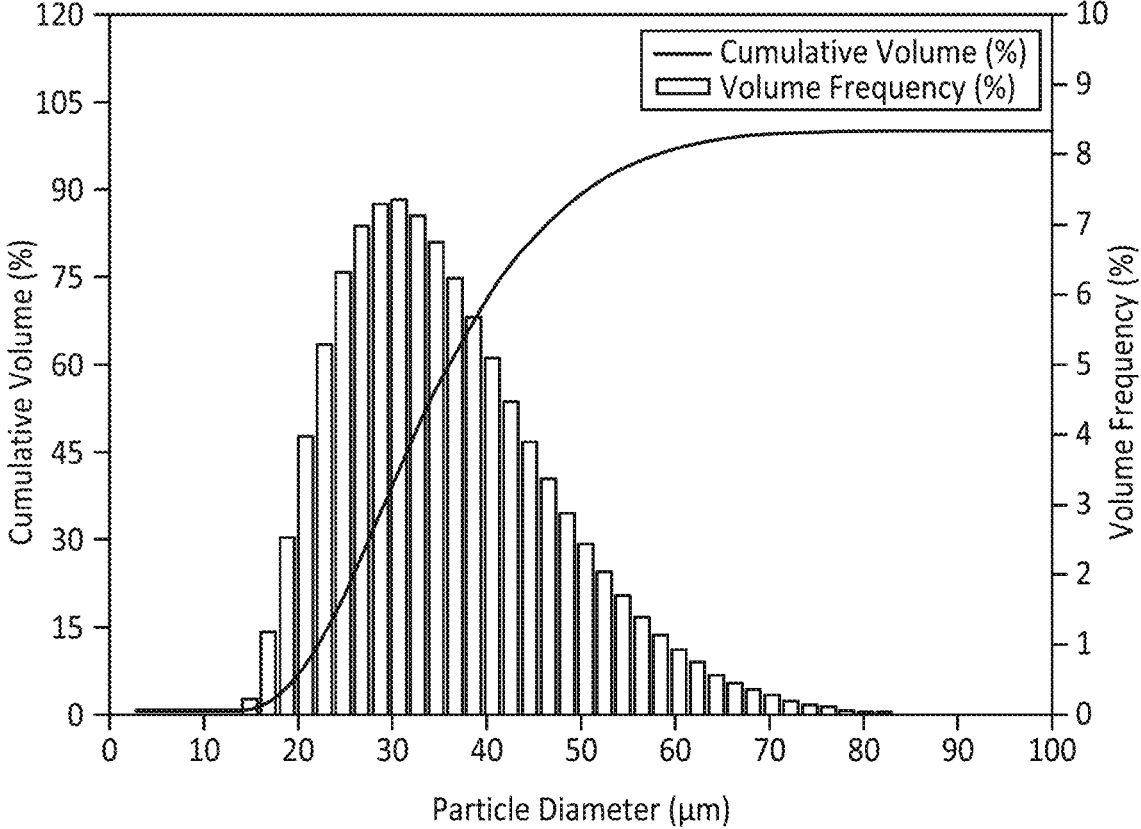
FIG. 12 is a size distribution plot for FeCoCrNiMn powder.

FIG. 10 is a wear track plot (pin on disk) for the uncoated single-crystal uncoated DD6 substrate. This was taken from Li, L., He, K., Sun, S. et al., "High-Temperature Friction and Wear Features of Nickel-Based Single Crystal Superalloy", Tribol Lett, 21 Jan. 2020, Vol. 68, No. 26, Springer Nature Switzerland AG, Cham, Switzerland. FIG. 11 is a wear track plot (ball on flat) for an HVOF FeCoCrNiMn coated substrate.

Other advantages of at least some embodiments relative to some laser cladding (and other high energy additive manufacture) alternatives may be a reduced heat affected zone in the substrate, higher coating hardness from the incoming semi-molten HVOF particle hardening effect, and less tight line-of-sight requirements. Relative to air plasma spray and suspension plasma spray, at least some HVOF embodiments may show lower heat effects, lower oxygen content, and/or higher hardness. Additionally, high velocity air-fuel (HVAF)

and cold spray are candidates. Of these three non-plasma techniques, HVOF generally has higher operating temperature and lower particle velocity than HVAF and cold spray. Cold spray generally has lower operating temperature and highest particle velocity. HVAF is generally intermediate in both parameters.

Despite testing the present parameters only on steel, the parameters are believed to transfer to nickel-based superalloy substrates and cobalt-based superalloy substrates in applications such as described above and below. Successful coating of nickel-based superalloy substrates to lower thickness using parameters such as the Patel et al. publication shows adequate adherence. That adherence is expected to be maintained with the new parameters.

Additional seal applications include rotating or static brush seal systems, namely the brush seal counterface (e.g., runner). Typical rotating brush seals have radially inwardly extending bristles engaging the OD surface of the counterface. U.S. Pat. No. 6,170,831B1 (the '831 patent), of Bouchard, Jan. 9, 2001, and entitled "Axial Brush Seal for Gas Turbine Engines", the disclosure of which is incorporated by reference herein in its entirety as if set forth at length, discloses a double-ended axial static brush seal system partially re-presented as 400 in FIG. 1C. The brush 402 has two protruding bristle sections 406, 407 (e.g., of a single cluster of bristles) engaging counterfaces (a case segment and a blade outer air seal segment). The repair may be applied to the counterface surface 408, 409 of the counterface substrate 410, 411 to engage the bristles.

Additional seal applications include examples involve knife edge seals (not shown). A typical knife edge seal has hardened knife edges. Thus, the runner (usually an OD surface of an inner member but optionally an ID surface of an outer member) may receive the present repair. An example knife edge seal is shown in U.S. Pat. No. 10,167,729B2 (the '729 patent), of Aiello et al., Jan. 1, 2019, and entitled "Knife Edge with Increased Crack Propagation Life", the disclosure of which is incorporated by reference herein in its entirety as if set forth at length.

Additional seal applications involve finger seals (not shown). With finger seals, the contacting portion of the counterface surface may be repaired. Example finger seals are shown in U.S. Pat. No. 10,094,389B2 (the '389 patent), of Chuong et al., Oct. 9, 2018, and entitled "Flow Diverter to Redirect Secondary Flow", and U.S. Pat. No. 9,845,695B2 (the '695 patent), of Budnick et al., Dec. 19, 2017, and entitled "Gas Turbine Seal Assembly and Seal Support", the disclosures of which are incorporated by reference herein in their entireties as if set forth at length.

Additional seal applications involve so-called HALO seals (not shown). One example is shown in U.S. Pat. No. 10,221,714B2 (the '714 patent), of Peters et al., Mar. 5, 2019, and entitled "Secondary Seal Device(s) with Alignment Tab(s)", the disclosure of which is incorporated by reference herein in its entirety as if set forth at length. Relative to PSRs, brush seals, and finger seals, the HALO seal may be a relatively expensive replacement piece. Thus, not only is the counterface (inner member/runner or shaft OD surface) subject to repair, the ID surface of the HALO seal may be so repaired. Additionally, alignment or mounting tabs are typical in such seals and may be repaired as noted above.

Among additional locations for repair are in snap fit interfaces 460 (FIG. 1D) (e.g., either fully backlocked or detented). One example of a snap fit between two components involving a bead and groove interaction for mounting a swirler is shown in U.S. Pat. No. 10,101,031B2 (the '031 patent), of Williams et al., Oct. 16, 2018, and entitled "Swirler Mount Interface for Gas Turbine Engine Combustor", the disclosure of which is incorporated by reference herein in its entirety as if set forth at length. The '031 patent discloses an OD (relative to swirler/injector axis 470) projection or bead 464 on a swirler 462 captured in an ID groove 468 in a bulkhead support shell 466. The repair may be applied to one or both of the inner member (e.g., swirler) and outer member (e.g., bulkhead support shell) at the bead or groove and adjacent contacting OD and ID surface regions respectively depending on damage extent and extent of needed material removal for preparation.

With the swirler example, the diameter may be much smaller than many seal locations that circumscribe the engine axis. Thus, for local repairs, the repair may represent a much greater extent in angle about the swirler axis than a seal runner or groove repair about the engine axis. Also, there is the possibility of a full annulus repair such as restoring the bead or resurfacing the groove.

Additional examples involve tabs 481 (FIGS. 13&14) of a first component 480 in slots 483 in a second component 482 For example, in many annular mounting situations, tabs may protrude radially (inward or outward depending on the situation) and be received in associated slots. Example such tabs have first and second axial end faces 484, 485 facing or contacting slot end faces 486 and 487 and tab circumferential end faces (ends) 488, 489 contacting or facing slot circumferential end faces (ends) 490, 491. Typically, pressure or spring loading will bias one axially facing face 484 of the tab against the adjacent axially facing face 486 of the slot. Particularly that axial end face of the tab may be subject to wear damage. But also, circumferential end faces will typically provide some locating function and may also be restored to dimensions. Spray access makes it easier to coat the tab faces (with a normal angle of incidence than coating slot faces (where the angle will be more off normal). Thus, potentially, the repair may oversize the tabs to make up for wear of the slot. Also, in the FIG. 14 example, there may be contacting surfaces 494, 496 of the components 480, 482 respectively aside the tab proximal end (base/root) and slot open end (opening). these contacting surfaces may also be repaired by the present methods. The example slot is shown as having a depth (or radial height in the radial tab example) to provide clearance between its base or outer end 497 and the distal end (tip) 495 of the tab when the surfaces 484 and 496 are locally contacting at the tab. The tab repair may be essentially to an entire surface such as the axial end face rather than highly localized.

Other examples involve locating pins. FIG. 15 shows a locating pin joint having a locating pin 500. FIG. 15 shows the joint and pin as having a common axis 501. Forming a first/proximal end of the pin in this example is a head or terminal flange 502. A shaft generally extends from an underside of the head to a distal end 504. A proximal portion 506 of the shaft mounts to a first component 508. An example first component is an engine case. An example mounting is via press-fit or threading into a boss of the case either directly or to an insert in the boss. In this example, the shaft exterior surface 512 along a proximal portion 510 of the shaft is so externally threaded to mate with an internal thread of the case boss or insert.

Along a distal end portion 514 of the shaft, the shaft exterior surface 512 is in sliding engagement with a second component. An example engagement is with the inner diameter surface 520 of a boss 522 of the second component acting as a socket for said pin distal end portion. In the example, the second component is an annular combustion chamber liner 526 held spaced apart from the case (e.g., radially inward). The boss may be separately formed from and welded to a main section of the liner. Example wearing movement is between the OD surface 512 and ID surface 520. Relative movement is parallel to the axis 501 and typically results from differential thermal expansion and engine vibration. Thus, one or both of these surfaces (surface 512 along the distal portion and surface 520) may be repaired via the present methods. Typically, the pin will instead be replaced, leaving only the boss 522 ID surface 520 for the repair. The repair may be full annulus around the axis of the boss 522/surface 520 or may be partial. for example, loading may tend to wear the surface 520 at one circumferential zone and just that zone might be repaired (e.g., with some buffer around for machining), leaving a portion of the circumference of the surface 520 unrepaired/ without the HEA. Other configurations of locating pins and, particularly, their mating members may be repaired, including tapered pins in mating sockets.

Yet another repair example is the outer diameter surface of a shrouded blade that interfaces with surrounding static case responsible for gas path sealing at the blade tip area.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A method for repairing damage at a damage site on the surface of a nickel- or cobalt-based alloy component, the method comprising:
    machining at the damage site; and
    applying a high entropy alloy (HEA) repair material to the damage site via high velocity oxy-fuel (HVOF) spray, high velocity air-fuel (HVAF) spray, or cold spray,
wherein the repair material comprises in atomic percent:
    16.0 to 25.0 Fe;
    16.0 to 25.0 Co;
    16.0 to 25.0 Cr;
    16.0 to 25.0 Mn; and
    16.0 to 25.0 Ni.

2. The method of claim 1 wherein:
the applying is via HVOF.

3. The method of claim 1 wherein:
the surface is full annulus or a sector of an annulus; and
the applying is only to a partial circumferential extent of said full annulus or sector.

4. The method of claim 1 wherein:
the surface is an inner diameter surface.

5. The method of claim 1 wherein:
the surface is an axial end surface of a groove.

6. The method of claim 1 wherein:
the surface is an axial end surface of a radial tab.

7. The method of claim 1 wherein:
the surface is an inner diameter surface of a mounting pin socket.

8. The method of claim 1 wherein the repair material comprises in atomic percent:
no more than 1.0 other individually and 5.0 other total.

9. The method of claim 8 wherein:
the repair material is applied to a thickness of at least 0.50 millimeter;
a powder feed rate of the HVOF spray is 40 g/min. to 50 g/min.; and
a rate of oxygen is 100% to 250% a rate of fuel in the HVOF spray, measured in LPM.

10. The method of claim 1 wherein:
the repair material is applied to a thickness of at least 0.50 millimeter.

11. The method of claim 10 wherein the repair material comprises by atomic percent:
no more than 1.0 other individually and 5.0 other total.

12. The method of claim 1 wherein one or more of:
the repair material is applied to a thickness of at least 0.50 millimeter;
a powder feed rate of the HVOF spray is 40 g/min. to 50 g/min.; and
a rate of oxygen is 100% to 250% a rate of fuel in the HVOF spray, measured in LPM.

13. The method of claim 1 further comprising:
surface finishing to remove excess repair material;
disengaging the surface of the component from a second component prior to the machining; and
after the applying, reengaging the surface of the component to the second component or to a replacement second component, wherein the reengaging or engaging is without any further thermal sprayed coating atop the repair material.

14. The method of claim 1 wherein the component is a first component of a gas turbine engine, the gas turbine engine comprising:
    one or more compressor sections;
    a combustor;
    one or more turbine sections; and
    a gaspath passing through the one or more compressor sections, the combustor section, and the one or more turbine sections,
wherein:
    the first component is sealed to a second component by a seal;
    the first component has a substrate;
    the substrate has a recess to which the repair material is applied; and
    a contact area between the seal and the first component includes the repair material and an adjacent surface of the substrate.

15. The method of claim 14 wherein:
the contact area is at least 355° and 1° to 5° of that is with the repair material.

16. The method of claim 14 wherein:
the repair material has a thickness of 0.30 mm to 2.0 mm.

17. The method of claim 14 wherein the repair material comprises in atomic percent:
no more than 1.0 other individually and 5.0 other total.

18. The method of claim 17 wherein:
the repair material has a thickness of 0.30 mm to 2.0 mm.

19. The method of claim 14 wherein:
the second component has a radially outwardly open groove axially capturing the seal and the first component encircles the seal; or
the first component has a radially outwardly open groove axially capturing the seal and the second component encircles the seal.

20. The method of claim 14 wherein:
the first component comprises a counterface of the seal; and the seal is selected from the group consisting of piston seal rings, brush seals, and finger seals.

21. The method of claim 1 wherein the component has:

a contact surface for contacting another component; and the machining forms:

a recess at the contact surface to which the repair material is applied.

22. The method of claim 21 wherein at least one of:

the component is in a gas turbine engine comprising: one or more compressor sections; a combustor; one or more turbine sections; and a gaspath passing through the one or more compressor sections, the combustor section, and the one or more turbine sections;

the another component is a seal or a locating pin; and the contact area between the component and the another component includes the HEA-repair material and an adjacent surface of a substrate of the first component.

\* \* \* \* \*